March 29, 1938.  C. GLEASON  2,112,770
ROTARY GAS ENGINE
Original Filed Nov. 2, 1935    6 Sheets-Sheet 1

Fig. 1.

Inventor
Charles Gleason
By Bacon & Thomas,
Attorneys

March 29, 1938.  C. GLEASON  2,112,770

ROTARY GAS ENGINE

Original Filed Nov. 2, 1935   6 Sheets-Sheet 2

Inventor
Charles Gleason

By Bacon & Thomas
Attorneys

March 29, 1938. C. GLEASON 2,112,770
ROTARY GAS ENGINE
Original Filed Nov. 2, 1935 6 Sheets-Sheet 4

Fig. 5.

Inventor
Charles Gleason
By Bacon + Thomas
Attorneys

March 29, 1938.    C. GLEASON    2,112,770
ROTARY GAS ENGINE
Original Filed Nov. 2, 1935    6 Sheets-Sheet 5

Inventor
Charles Gleason

By Bacon + Thomas
Attorneys

March 29, 1938.  C. GLEASON  2,112,770
ROTARY GAS ENGINE
Original Filed Nov. 2, 1935  6 Sheets-Sheet 6

Fig. 9.

Inventor
Charles Gleason

By Bacon & Thomas
Attorneys

Patented Mar. 29, 1938

2,112,770

UNITED STATES PATENT OFFICE 2,112,770

ROTARY GAS ENGINE

Charles Gleason, Detroit, Mich.

Application November 2, 1935, Serial No. 48,025
Renewed September 18, 1937

13 Claims. (Cl. 123—14)

This invention relates to new and useful improvements in rotary gas engines.

The primary object of this invention is to provide a rotary gas engine which will have a relatively high efficiency rating due to low friction losses, a minimum number of reciprocating parts, and a rotor which will operate under perfectly balanced conditions as to centrifugal forces and internally developed pressures.

Another principal object of the invention is to provide a gas engine which will develop more horsepower per pound by weight and which may be operated at a higher rate of speed than any reciprocating piston type of engine now in common use.

A further object of the invention is to provide a rotary gas engine which may be readily assembled and disassembled to facilitate cleaning, repairing and replacement of parts.

A still further object of the invention is to provide a rotary gas engine which employs means for effecting the operations of drawing in and compressing the fuel charges which are separate from the means employed for delivering the power impulses to the drive shaft and for exhausting the spent gases resulting from explosion of the fuel charges.

Other objects and advantages of the invention will be apparent during the course of the following description.

In the accompanying drawings forming a part of this specification and in which like numerals are employed to designate like parts throughout the same.

In the drawings, wherein for the purpose of illustration is shown a preferred embodiment of this invention, the reference characters 10 and 11 designate in their entirety the upper and lower half sections of the stator casing. It will be noted that these half casing sections are securely joined together by the plurality of bolts 12 which extend through aligned apertured ears 13 formed on the stator sections, and the nuts 14 which are threaded on the ends of the bolts. This manner of connecting the stator casing sections together is clearly illustrated in Figs. 1 to 3, inclusive.

Figure 1:
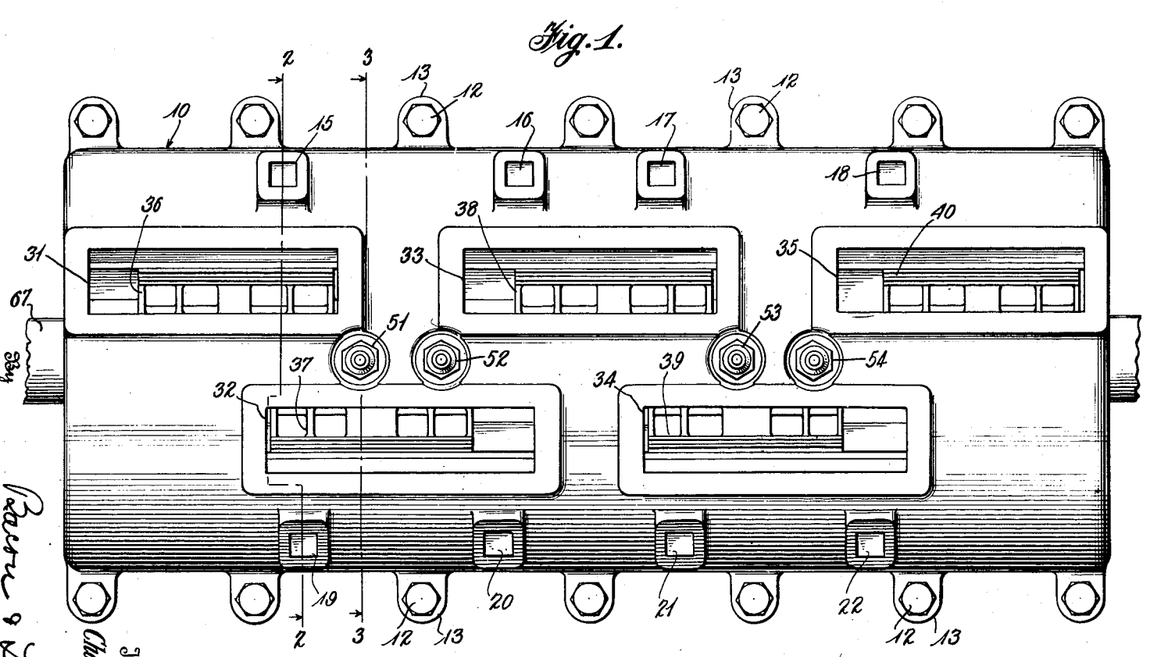
Figure 1 is a top plan view of a rotary gas engine employing this invention.
Figure 4:
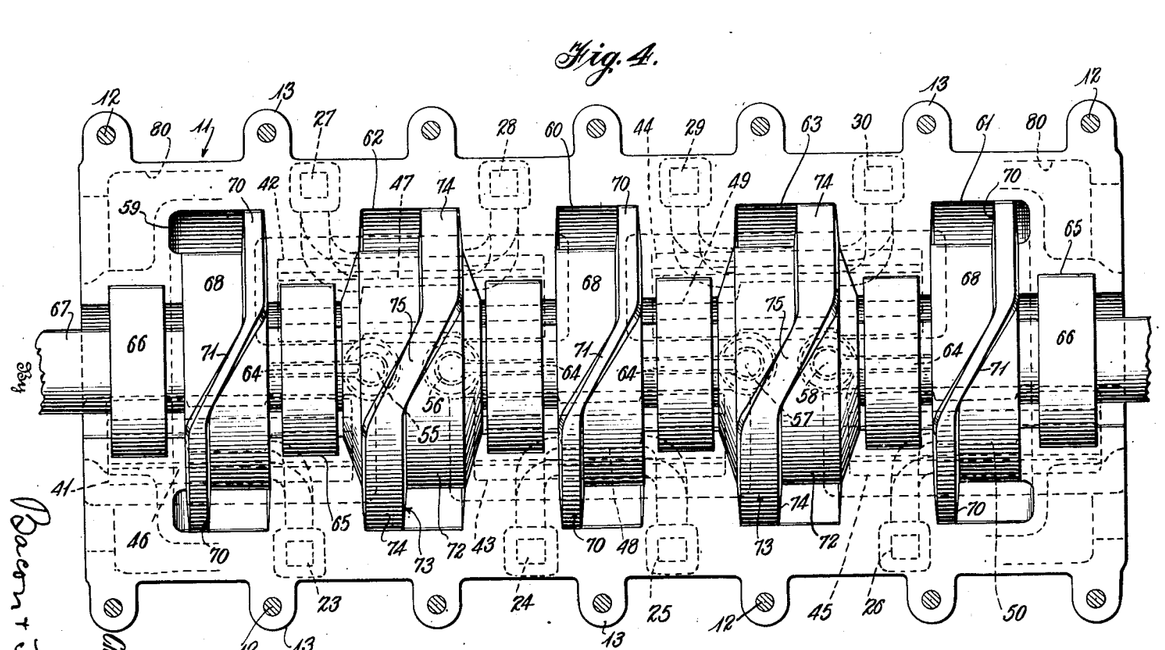
Figure 4 is a plan view of one stator casing section with the various rotors and the shaft illustrated as being operatively positioned therein.

Figure 1 illustrates in top plan the exterior of the upper stator casing section 10. Fig. 4 illustrates in inside plan the lower stator casing 11. It is to be understood that the lower stator casing section will have the same appearance as that disclosed in Fig. 1 when viewed from the outside. Also, the upper stator casing section 10 will have the same appearance as the casing section 11, shown in Fig. 4, when the said section 10 is viewed from the inside. A description of the outside of casing section 10, in connection with Fig. 1, will suffice for both stator sections. A detailed description of the interior of stator casing 11, in connection with Fig. 4, also will be sufficient description for the inside of stator casing section 10.

Referring to Fig. 1, it will be noted that there is provided a series of four inlet ports which bear the reference characters 15, 16, 17, and 18. On the opposite side of the stator casing section 10 there is provided a series of exhaust ports which bear the reference characters 19, 20, 21, and 22. In view of the fact that the drawing in of fuel charges and the exhausting of spent gases occurs in each half section of the stator casing, Fig. 4 also discloses a series of inlet passages which bear the reference characters 23, 24, 25, and 26, and a series of exhaust passages which bear the reference characters 27, 28, 29, and 30.

Again referring to Fig. 1, it will be noted that a series of five elongated openings are provided which bear the reference characters 31, 32, 33, 34, and 35. These openings are employed to permit abutments 36, 37, 38, 39, and 40 to be inserted into operative relation with the peripheral cams of the respective rotors which will be described in detail at a later point. An equal number of openings and abutments are provided for the lower half of the stator casing section 11 and are illustrated in dotted lines in Fig. 4. The various elongated openings in this lower section 11 bear the reference characters 41, 42, 43, 44, and 45. The abutments inserted through these openings 41 to 45, inclusive, bear the reference characters 46, 47, 48, 49, and 50.

Suitable spark plugs 51, 52, 53, and 54 are mounted in the upper stator casing section 10. A like number of spark plugs 55, 56, 57, and 58 are mounted in the lower stator casing section 11. The location of these various spark plugs with respect to the internal working parts of the rotary gas engine will be described at a later point.

Figure 5:
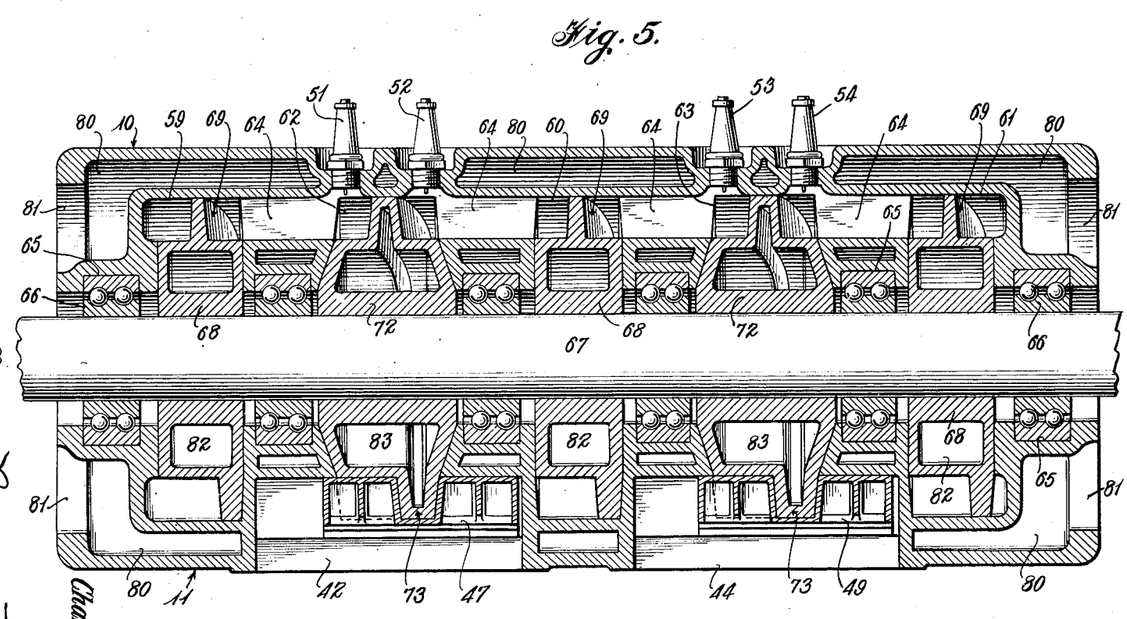
Figure 5 is a longitudinal vertical sectional view taken on lines 5—5 of Fig. 2.

Referring to Figs. 4 and 5, it will be seen that the stator sections 10 and 11 are provided with a plurality of rotor compartments. The alternative compartments 59, 60, and 61 will be defined as fuel intake and compression compartments. The remaining compartments 62 and 63 will be defined as power developing and spent gas exhausting compartments. It will be understood that the aligned and mating cavities formed in the respective stator sections cooperate to form the respective compartments 59 to 63, or that one half of each one of these compartments is formed in each stator casing half.

It will be noted from an inspection of Fig. 4 that the inlet passage 23 extends to and communicates with one side of the compartment 59 while the inlet ports 24 and 25 communicate with opposite sides of the compartment 60, and the inlet port 26 communicates with one side of the compartment 61. Likewise, it will be noted that the exhaust passages 27 and 28 communicate with opposite sides of the compartment 62 while the exhaust passages 29 and 30 communicate with opposite sides of the compartment 63. Although not illustrated in detail, it will be understood that the inlet passages 15 and 16, see Fig. 1, will communicate with adjacent sides of the compartments 59 and 60 while the inlet passages 17 and 18 will communicate with adjacent sides of the compartments 60 and 61. Also, the exhaust ports 19 and 20 will communicate with opposite sides of the compartment 62 while the exhaust passages 21 and 22 will communicate with opposite sides of the compartment 63. In other words, the various inlet passages 15 to 18 inclusive, are associated with the compartments 59, 60, and 61 in the same manner as the inlet passages 23 to 26, while the exhaust passages 19 to 22, inclusive, are arranged with respect to the compartments 62 and 63 in the same manner as the exhaust passages 27 to 30.

Fuel bypasses 64 are illustrated in dotted lines in Fig. 4 as forming connections between the adjacent sides of all of the compartments 59 to 63. These bypasses function to permit the transfer of compressed fuel from the compartments 59 to 61, inclusive, to the compartments 62 and 63 within the lower stator section 11. It will be understood, by inspecting Fig. 2, that the upper stator section 10 is provided with a like number of fuel bypasses 64 for accomplishing the same purpose as the bypasses provided in the lower stator section 11. It will be noted by inspecting Figs. 4 and 5 that the spark plugs are located so that one will be provided for each one of the fuel bypasses 64.

By inspecting Figs. 4 and 5, it will be seen that the sections of the stator casing are provided on opposite sides of each one of the compartments 59 to 63 with bearing compartments 65 which receive anti-friction bearings 66. These bearings are arranged to journal the shaft 67 which extends axially through all of the compartments 59 to 63, inclusive.

Suitably keyed to the shaft 67 and arranged in the compartments 59 to 61, inclusive, are rotors 68. Each one of these rotors is provided with a peripheral cam which is designated in its entirety by the reference character 69. Each one of these cams 69 is provided with two, diametrically opposed, straight portions 70 which are staggered with respect to each other. That is, the opposed straight portions 70 for each rotor 68 are arranged in axially spaced relation. These straight portions 70 will be defined as cam closures in view of their functioning to close the inlet ports and the fuel bypasses which communicate with their respective compartments.

Interconnecting adjacent ends of the cam closures 70 are cross-over portions 71. There will be two of these cross-over portions 71 provided for each of the cams 69. These cross-over portions 71 will be defined as cam heads in view of the fact that they function in the same manner as double acting piston heads in drawing in fuel charges and compressing said charges.

Suitably fastened to the shaft 67, and occupying the compartments 62 and 63, are rotors 72. These rotors will be defined as impulse delivering and spent gas exhausting rotors in view of the fact that they deliver the power impulses to the shaft 67 and function to exhaust the spent gases after explosion and expansion of the same. These rotors 72 are provided with peripheral cams which will be designated in their entirety by the reference character 73. Each one of these cams 73 is provided with diametrically arranged straight portions 74 which, as in the case of the straight portions 70 of the cams 69, will be defined as cam closures for these straight portions 74 function to close the fuel bypasses 64 and the exhaust passages 19 to 22, inclusive, and 27 to 30, inclusive, for the compartments 62 and 63. These cam closures 74 are staggered in the same manner as that described in connection with the cam portions 70. Interconnecting adjacent ends of the cam closures 74 are cross-over portions 75. These cross-over portions also will be defined as cam heads because they function in the same manner as double acting pistons to receive the power impulses developed by the firing of the various charges and to exhaust the spent gases resulting from the explosion of the compressed fuel charges delivered to the compartments 62 and 63.

Figure 6:
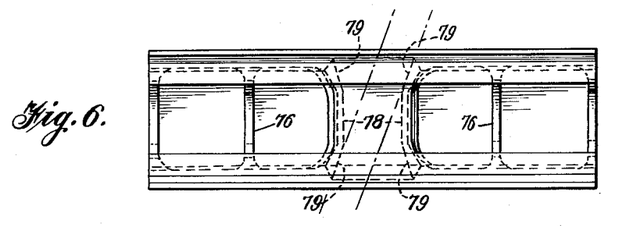
Figure 6 is a top plan view of the type of abutment employed throughout this rotary engine.
Figure 7:
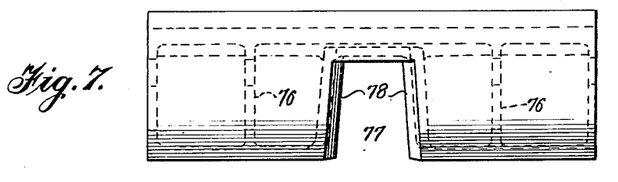
Figure 7 is a side elevational view of the abutment disclosed in Fig. 6.

Figs. 6 and 7 illustrate one of the abutments 36 to 40, inclusive, and 46 to 50, inclusive. As all of these abutments are formed alike, a description of one of the same will be sufficient. The abutment of Figs. 6 and 7 is of shell-like or hollow construction with apertured reinforcing webs 76 formed therein in the manner illustrated. The central portion of the abutment is cut away at 77 to accommodate its rotor cam. The cut-away portion 77 is provided at its mid-section with straight, parallel surfaces 78. Flat, diverging surfaces 79 are formed laterally of the straight central surfaces 78. The straight parallel surfaces 78 are designed to cooperate with the cam closure portions of the cam straddled by the abutment. The cooperation of these straight surfaces 78 and the cam closures is such that no leakage of fuel, gas, or the like, will be permitted past the same. The diverging surfaces 79 of the cut-away portion 77 are designed to cooperate with the opposite side surfaces of the cam heads for the cam with which the abutment is associated. This cooperation between the diverging surfaces 79 and the cam heads is illustrated in Fig. 6. It will be understood that one diverging surface 79 for each straight central surface 78 will cooperate simultaneously with one cam head. The remaining two diverging surfaces 79 will simultaneously cooperate with the remaining cam head of the cam straddled by the abutment. In this way, no leakage of fuel, or the like, will be permitted while the cam heads of the cams are passing through the abutments. The junctures of the cam heads and cam closures are sloped in such a manner that they will smoothly ride through the cutaway portions 77 and will effectively bring about the change in contact between the surfaces 78 and 79 of the abutment and the side surfaces of the cam heads and closures.

Figure 2:
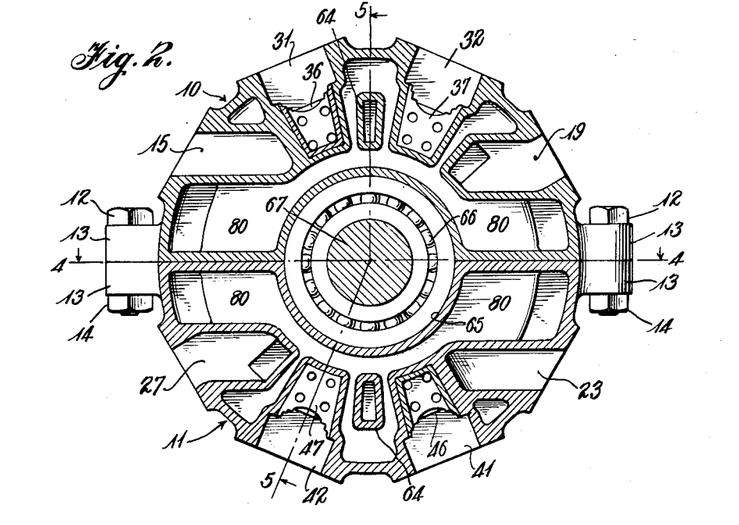
Figure 2 is a vertical transverse sectional view taken on line 2—2 of Fig. 1.
Figure 3:
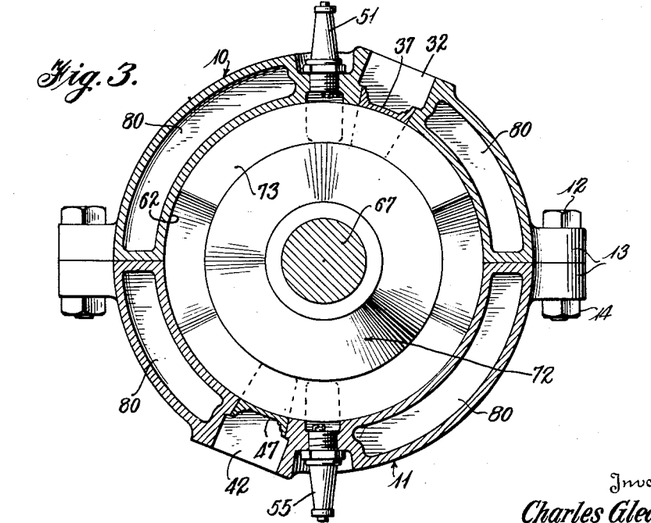
Figure 3 is a vertical transverse sectional view taken on line 3—3 of Fig. 1.

The abutments are made hollow to make them as light as possible. Figs. 1, 2, and 3 disclose the openings 31 to 35 and 41 to 45 as being uncovered. It will be understood, however, that all of these openings will be closed in a suitable manner.

Figs. 2 to 5, inclusive, illustrate proper coring 80 for the stator casing sections to permit circulation of a cooling medium therethrough. Openings 81 are provided at the opposite ends of the stator casing sections, as clearly illustrated in Fig. 5, which may be used for circulating a cooling medium if desired. This coring 80 is arranged to permit circulation of the cooling medium around all of the bearings, the various compartments 59 to 63, the fuel inlet and exhaust passages, the various fuel bypasses, etc., to effectively cool all working parts of the engine.

Fig. 5 clearly illustrates that all of the rotors 68 are hollowed out at 82 to permit efficient cooling of these rotors. The rotors 72 are illustrated in this figure as having the body portions of the same and their cams hollowed out at 83. This hollow formation of all of the rotors will permit of the circulation of a cooling medium therethrough. The exact manner of accomplishing this circulation is not completely illustrated, however, it may be effected in any suitable way.

Figure 8:
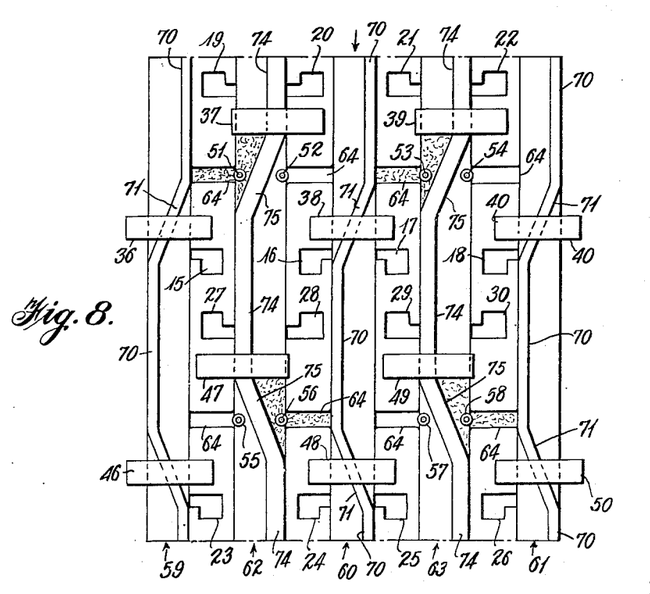
Figure 8 is a developed view of the various rotors with their peripheral cams, the sliding abutments straddling the various cams, bypasses interconnecting adjacent rotor compartments, and inlet and exhaust passages for the various compartments; said view illustrating the relationship of the various fuel suction, compression, explosion, and exhausting strokes or operations for the various units of the engine.
Figure 9:
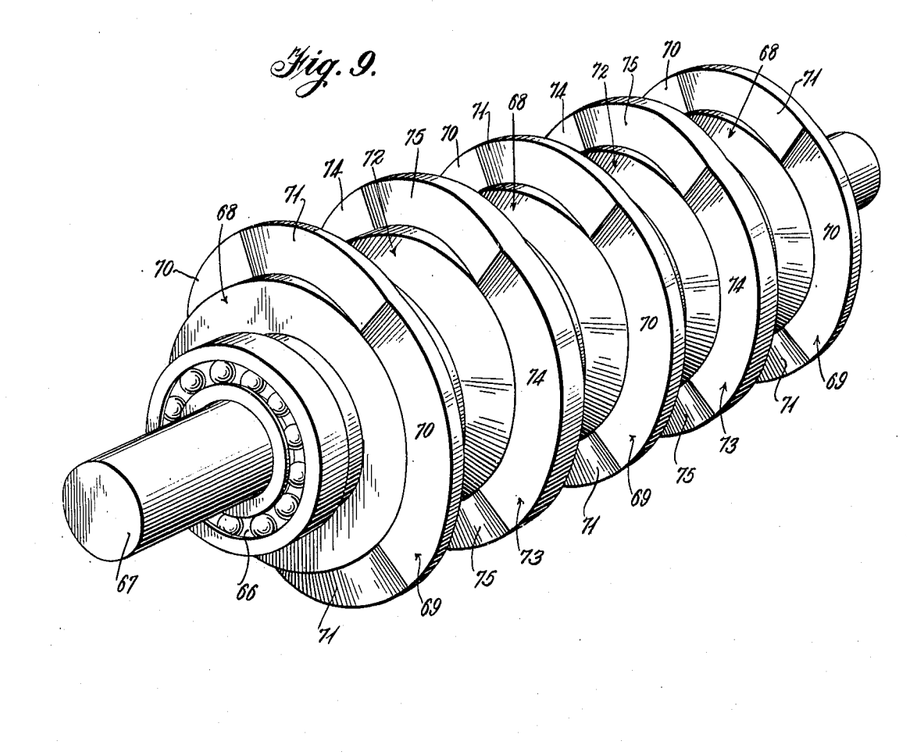
Figure 9 is a perspective view of the rotor.

The development view of Fig. 8 will be employed for describing the mode of operation of this engine.

In Fig. 8 it will be noted that the cam heads 71 of the rotors located in the compartments 59, 60, and 61 are advanced with reference to the cam heads 75 on the rotors located in the compartments 62 and 63. In Fig. 4, however, the cam heads 71 are illustrated as being arranged in alignment with the cam heads 75. The arrangement of the respective cam heads in Fig. 8 illustrates the operation of this rotary gas engine at a high compression ratio to cause the cam closure portions 70 to close the fuel by-passes 64 when the cam heads 75 start their power strokes. In the arrangement of Fig. 4, the cam heads 75 are advanced through their power strokes before the cam closures 70 close the fuel by-passes 64. It will be appreciated, therefore, that the compression ratio of this form of engine can be varied widely by changing the relationship between the cam heads 71 and the cam heads 75.

Fig. 8 discloses the various peripheral cams for the different rotors, the abutments associated with said cams, the various fuel inlet passages and fuel outlet passages, and the fuel by-passes with their associated charge igniting devices. In describing the operation of this arrangement of elements, the relationship between each charge forming and feeding rotor and its cooperating power developing rotor will be simultaneously referred to.

The mechanism associated with the compartment 59 functions to draw in charges of fuel, compress the same, and feed the compressed charges to the left side of the cam carried by the rotor located in the power compartment 62. It will be noted that the upper cam head 71 has just completed compressing and feeding a charge of fuel through its by-pass 64 into the compartment 62 above the upper cam head 75. The igniting device 51 therefore will ignite this compressed charge and deliver a power impulse to the left hand face of the upper cam head 75 for the compartment 62. The cam closure 70 located above the abutment 36 has closed the by-pass 64. The lower cam head 71 for the compartment 59 is completing its suction stroke in which it has drawn a charge of fuel through the inlet passage 15. The upper cam head 71 for the compartment 59 is passing through the abutment 36 and is starting on a compression stroke. Before the compression stroke has progressed to any great extent, the cam closure 74, located in compartment 62, will have advanced through the abutment 47 for closing the adjacent end of the lower by-pass 64 so that this charge of fuel may be compressed in the compartment 59. The lower cam head 71 in the compartment 59 is passing through the abutment 46 and is just starting on a fuel suction stroke wherein a charge of fuel will be drawn through the inlet passage 23. The lower cam head 75 in the compartment 62 is starting an exhaust stroke which will exhaust the charge fired by the ignition device 55 through the exhaust passage 19 for the compartment 62.

The cooperation between the left hand side of the cam located in compartment 60 with the right hand side of the cam located in compartment 62 now will be described.

The upper cam head 71 in the compartment 60 is just completing a suction stroke in which a charge of fuel has been drawn through the inlet passage 24. As this cam head 71 passes through the abutment 38, it starts on a suction stroke during which a charge of fuel will be drawn in through the passage 16. The lower cam head 71 in the compartment 60 has just completed a compression and fuel feeding stroke and has fed a charge of fuel into the compartment 62 rearwardly of the lower cam head 75 located in this compartment. The igniting device 56 will fire this charge which will deliver a power impulse to this lower cam head 75. The upper cam head 75 in compartment 62 is starting on an exhaust stroke during which the charge fired by the ignition device 52 will be expelled through the exhaust port 28.

It now will be seen that both cam heads 75 located in the compartment 62 simultaneously receive power impulses and simultaneously effect exhausting of previously exploded charges. As these cam heads 75 are located at diametrically opposed points of the shaft 67, these power impulses and power pressure forces will be completely balanced. The sides of the cams located in compartments 59 and 60 which draw in fuel charges, compress the same, and feed them to the opposite sides of the cam located in compartment 62, will perform their suction and compression strokes in a perfect balanced relation both axially of the engine and radially.

The mode of operation and cooperation between the opposite sides of the cam located in compartment 63 and the adjacent sides of the cams located in compartments 60 and 61 are the same as the similar portions of the cams located in compartments 59, 60, and 62. It, therefore, is believed to be unnecessary to repeat this mode of operation and cooperative relationship between the cams of compartments 60, 61, and 63.

It is to be understood that the form of this invention herewith shown and described is intended to be taken as a preferred example of the same and that various changes in shape, size and arrangement of parts may be resorted to without departing from the spirit of the invention or the scope of the subjoined claims.

Having thus described the invention, I claim:—

1. A rotary gas engine of the type described comprising a stator, a shaft journaled in said stator, a plurality of rotors mounted on said shaft, means operatively associated with certain of said rotors for causing each of the latter to deliver four power impulses to the shaft and exhaust the spent gases resulting from said impulses during each complete revolution of the shaft, means operatively associated with the remaining rotors for causing the latter to draw in, compress and feed to the first-mentioned rotors fuel charges sufficient in number to produce said power impulses, and means for causing each of the power rotors to receive the fuel charges for half of its impulses from one of said fuel feeding rotors and the remainder from another of said feeding rotors.

2. A rotary gas engine of the type described comprising a stator, a shaft journaled in said stator, a plurality of rotors mounted on said shaft, means operatively associated with said rotors for causing the latter to deliver the explosion forces to the shaft and to exhaust the spent gases, a plurality of different devices driven by the shaft for drawing in fuel charges, compressing said charges, and delivering the compressed charges to said rotors, and means for causing the fuel charges to be delivered to each of the power rotors by a plurality of the charge delivering devices.

3. A rotary gas engine of the type described comprising a stator, a shaft journaled in said stator, a plurality of rotors mounted on said shaft, means operatively associated with said rotors for causing each of the latter to deliver a plurality of power impulses to the shaft and exhaust the spent gases resulting from said impulses during each complete revolution of the shaft, a plurality of independent devices driven by the shaft for drawing in, compressing, and feeding fuel charges to the rotors sufficient in number to produce the desired power impulses, and means for causing each power rotor to receive the fuel charges for its successive impulses from different ones of the fuel charge feeding devices.

4. A rotary gas engine of the type described comprising a stator split into a plurality of parts, means for connecting said parts, a shaft journaled in said stator, a plurality of rotors mounted on said shaft, means operatively associated with certain of said rotors for causing the latter to deliver the explosion forces to the shaft and to exhaust the spent gases, means operatively associated with the remaining rotors for causing the latter to draw in fuel charges, compress said charges, and deliver the compressed charges to the first-mentioned rotors, and means for causing the fuel charges to be delivered to each of the power rotors from a plurality of the charge delivering rotors.

5. A rotary gas engine of the type described comprising a stator split axially into a plurality of parts, means for connecting said parts, a plurality of rotor compartments formed in said stator, a shaft journaled in said stator to extend axially of all of said compartments, a rotor for each compartment mounted on said shaft, means operatively associated with certain of said rotors for causing each of the latter to deliver a plurality of power impulses to the shaft and exhaust the spent gases which produced said impulses during each complete revolution of the shaft, and means operatively associated with the remaining rotors for causing the latter to draw in, compress, and feed to the first-mentioned rotors fuel charges sufficient in number to produce said power impulses, each of said power rotors and its compartment receiving compressed fuel charges for its successive impulses from different ones of the fuel feeding compartments.

6. A rotary gas engine of the type described comprising a stator split axially into a plurality of parts, means for connecting said parts, a plurality of rotor compartments formed in said stator, a shaft journaled in said stator to extend axially of all of said compartments, a rotor for each compartment mounted on said shaft, each rotor having a peripheral cam formed thereon, each cam being divided into a plurality of straight portions arranged in staggered relation around said rotor with cross-over portions interposed between said straight portions, a plurality of abutments slidably mounted in said stator and arranged to straddle said cams, by-passes extending between all of the adjacent rotor compartments, fuel inlet ports communicating with each of certain of said compartments, and spent gas exhaust ports communicating with each of the remaining compartments on both sides of the cams of their rotors.

7. A rotary gas engine of the type described comprising a stator split axially into a plurality of parts, means for connecting said parts, a plurality of rotor compartments formed in said stator, a shaft journaled in said stator to extend axially of all of said compartments, a rotor for each compartment mounted on said shaft, each rotor having a peripheral cam formed thereon, each cam being divided into a plurality of straight portions arranged in staggered relation around said rotor with cross-over portions interposed between said straight portions, a plurality of abutments slidably mounted in said sector and arranged to straddle said cams, by-passes connected to all adjacent rotor compartments and located circumferentially between adjacent abutments for the rotors of the connected compartments, a charge igniting device associated with each by-pass, fuel inlet ports communicating with each of certain of said compartments, and spent gas exhaust ports communicating with each of the remaining compartments on both sides of the cams of their rotors.

8. A rotary gas engine of the type described comprising a stator having a plurality of rotor receiving compartments formed therein, a shaft journaled in said stator to extend axially through all of said compartments, a rotor mounted on said shaft within each compartment, means associated with certain of said rotors and their compartments for effecting drawing in of fuel charges, compressing said charges and delivering the compressed charges to the remaining compartments, means associated with the remaining rotors and their compartments for effecting delivery of explosive forces to the shaft and exhausting the spent gases, compressed fuel delivering passages connecting each of the latter mentioned compartments with more than one of the fuel delivering compartments, inlet ports for the fuel compressing compartments, and exhaust ports for the remaining compartments.

9. A rotary gas engine of the type described comprising a stator having a plurality of rotor receiving compartments formed therein, a shaft journaled in said stator to extend axially through all of said compartments, a rotor mounted on said shaft within each compartment, means associated with certain of said rotors and their compartments for effecting drawing in of fuel charges, compressing said charges and delivering the compressed charges to the remaining compartments, means associated with the remaining rotors and their compartments for effecting delivery of explosive forces to the shaft and exhausting the spent gases, compressed fuel delivering passages connecting each of the latter mentioned compartments with more than one of the fuel delivering compartments, inlet ports for the fuel compressing compartments, exhaust ports for the remaining compartments, and means carried by said rotors for effecting properly timed opening and closing of the inlet and exhaust ports and both ends of said fuel passages.

10. A rotary gas engine of the type described comprising a stator having a plurality of rotor receiving compartments formed therein, a shaft journaled in said stator to extend axially through all of said compartments, a rotor mounted on said shaft within each compartment, means associated with certain of said rotors and their compartments for effecting drawing in of fuel charges, compressing said charges and delivering the compressed charges to the remaining compartments, means associated with the remaining rotors and their compartments for effecting delivery of explosive forces to the shaft and exhausting the spent gases, compressed fuel delivering passages connecting each of the latter mentioned compartments with more than one of the fuel delivering compartments, inlet ports for the fuel compressing compartments, exhaust ports for the remaining compartments, means carried by said rotors for effecting properly timed opening and closing of the inlet and exhaust ports and both ends of said fuel passages, and a charge igniting device for each of said fuel passages.

11. A rotary gas engine of the type described comprising a stator having a plurality of rotor receiving compartments formed therein, a shaft journaled in said stator to extend axially through all of said compartments, a rotor mounted on said shaft within each compartment, means associated with certain of said rotors and their compartments for effecting drawing in of fuel charges, compressing said charges and delivering the compressed charges to the remaining compartments, means associated with the remaining rotors and their compartments for effecting delivery of explosive forces to the shaft and exhausting the spent gases, a plurality of compressed fuel delivering passages connecting each of the latter mentioned compartments with more than one of the fuel delivering compartments, a plurality of inlet ports for each fuel compressing compartment, and a plurality of exhaust ports for each of the remaining compartments.

12. A rotary gas engine of the type described comprising a stator having a plurality of rotor receiving compartments formed therein, a shaft journaled in said stator to extend axially through all of the said compartments, a rotor mounted on said shaft within each compartment, means associated with certain of said rotors and their compartments for causing each of said rotors and compartments to effect drawing in of a plurality of fuel charges compressing said charges and delivering the same to the remaining compartments during each revolution of the shaft, means associated with the remaining rotors and their compartments for causing each of said rotors and compartments to effect delivery of a plurality of explosive forces to the shaft and to exhaust the spent gases for said explosions during each revolution of the shaft, a plurality of compressed fuel delivering passages connecting each of the latter mentioned compartments with more than one of the fuel delivering compartments, a plurality of inlet ports for each fuel compressing compartment, and a plurality of exhaust ports for each of the remaining compartments.

13. A rotary gas engine of the type defined in claim 12, further characterized by the means associated with all of said rotors and compartments being so constructed and arranged as to cause the forces delivered to the various rotors and their shaft, during drawing in, compressing, exploding and exhausting of the various fuel charges for each revolution of the shaft to be distributed along and around the shaft so as to be balanced both axially and radially of the shaft.

CHARLES GLEASON.